US009607300B2

(12) United States Patent
Kurian

(10) Patent No.: US 9,607,300 B2
(45) Date of Patent: Mar. 28, 2017

(54) MULTI-LAYER TRANSACTION TRACKING

(71) Applicant: Bank of America Corporation, Charlotte, NC (US)

(72) Inventor: Manu Jacob Kurian, St. Louis, MO (US)

(73) Assignee: Bank of America Corporation, Charlotte, NC (US)

( * ) Notice: Subject to any disclaimer, the term of this patent is extended or adjusted under 35 U.S.C. 154(b) by 560 days.

(21) Appl. No.: 14/157,899

(22) Filed: Jan. 17, 2014

(65) Prior Publication Data

US 2015/0206141 A1 Jul. 23, 2015

(51) Int. Cl.
*G06Q 20/40* (2012.01)
*G06Q 20/38* (2012.01)
*G06Q 20/42* (2012.01)
*H04L 9/32* (2006.01)

(52) U.S. Cl.
CPC ....... *G06Q 20/401* (2013.01); *G06Q 20/3829* (2013.01); *G06Q 20/425* (2013.01); *H04L 9/3215* (2013.01); *G06Q 2220/00* (2013.01); *H04L 2209/24* (2013.01)

(58) Field of Classification Search
CPC .. G06Q 20/401; G06Q 20/425; H04L 9/3215; H04L 2209/24
See application file for complete search history.

(56) References Cited

U.S. PATENT DOCUMENTS 8,229,852 B2 * 7/2012 Carlson .................. G06Q 20/04
705/39
8,682,802 B1 * 3/2014 Kannanari ......... G06Q 20/3274
705/64

* cited by examiner

*Primary Examiner* — Jayesh Jhaveri
*Assistant Examiner* — Wasika Nipa
(74) *Attorney, Agent, or Firm* — Michael A. Springs; Moore & Van Allen PLLC; Nicholas C. Russell

(57) ABSTRACT

Embodiments for tracking multi-layer secured transactions include systems for providing a first transaction channel to a user and sending pre-authorization code to the user via the first transaction channel. The systems terminate the first transaction channel and provide a second transaction channel to the user and receive transaction data from the user comprising the pre-authorization code via the second transaction channel. The systems further identify one or more verifiers associated with the user for one or more transactions based on the transaction data, send a post verification notification to the one or more verifiers, and receive a post verification confirmation from at least one of the one or more verifiers in response to the post verification notification.

15 Claims, 6 Drawing Sheets

MULTI-LAYER TRANSACTION TRACKING

BACKGROUND

Payments and other transactions often go through various secure channels. Certain financial transactions involving large money transfers or sensitive information, however, may raise concerns for parties to the transaction. Such transactions are typically processed under different conditions than normal transactions. For example, specialized transaction may involve heavy manual input and complex coordination between parties. This type of processing can be inconvenient to the transaction parties and require a large amount of resources and time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments are directed to systems for multi-layer transaction tracking. The system includes a computer apparatus including a processor and a memory and a software module stored in the memory, comprising executable instructions that when executed by the processor cause the processor to provide a first transaction channel to a user. In some embodiments, the executable instructions further cause the processor to send pre-authorization code to the user via the first transaction channel. In some embodiments, the executable instructions further cause the processor to terminate the first transaction channel and provide a second transaction channel to the user. In some embodiments, the executable instructions further cause the processor to receive transaction data from the user comprising the pre-authorization code via the second transaction channel. In some embodiments, the executable instructions further cause the processor to identify one or more verifiers associated with the user for one or more transactions based on the transaction data. In some embodiments, the executable instructions further cause the processor to send a post verification notification to the one or more verifiers. In some embodiments, the executable instructions further cause the processor to receive a post verification confirmation from at least one of the one or more verifiers in response to the post verification notification.

In other embodiments of the systems, the executable instructions further cause the processor to terminate the third channel and provide a fourth channel, wherein the post verification confirmation is received via the fourth channel. In still other embodiments, the executable instructions further cause the processor to process the one or more transactions on behalf of the user. In some embodiments, the executable instructions further cause the processor to determine that the post verification confirmation requires one or more signature from the identified one or more verifiers; determine that all required signatures are received; and process one or more transactions on behalf of the user. In further embodiments, the post verification notification comprises at least one of a message, a transaction statement, and a code. In still further embodiments, the executable instructions further cause the processor to determine that the post verification confirmation requires multiple split keys from the one or more verifiers, wherein each of the split keys comprises at least a portion of a master key.

In additional embodiments, the executable instructions further cause the processor to determine that all of the required split keys are received from the one or more users and process the one or more transactions. In other embodiments, the executable instructions further cause the processor to determine that not all of the required split keys are received and stop payment for the one or more transactions if all of the required split keys are not received. In still other embodiments, the first channel and the second channel are different types of channels or the first channel and the second channel are the same types of channel. In further embodiments, the executable instructions further cause the processor to create multiple pre-authorization codes; store the multiple pre-authorization codes in a database; receive a pre-authorization code request from the user; select one of the stored codes for sending to the user. In still further embodiments, the executable instructions further cause the processor to receive a request for the pre-authorization code from the user and generate the pre-authorization code in response to receiving the request.

Also provided are embodiments directed to computer program products for multi-layer transaction tracking. The computer program products include a non-transitory computer readable storage medium having computer readable program code embodied therewith, the computer readable program code comprising computer readable program code configured to provide a first transaction channel to a user. In some embodiments, the computer program products further include computer readable program code configured to send pre-authorization code to the user via the first transaction channel. In some embodiments, the computer program products further include computer readable program code configured to terminate the first transaction channel and provide a second transaction channel to the user. In some embodiments, the computer program products further include computer readable program code configured to receive transaction data from the user comprising the pre-authorization code via the second transaction channel. In some embodiments, the computer program products further include computer readable program code configured to identify one or more verifiers associated with the user for one or more transactions based on the transaction data. In some embodiments, the computer program products further include computer readable program code configured to send a post verification notification to the one or more verifiers. In some embodiments, the computer program products further include computer readable program code configured to receive a post verification confirmation from at least one of the one or more verifiers in response to the post verification notification.

In other embodiments, the computer program products further include computer readable program code configured to terminate the third channel and provide a fourth channel; wherein the post verification confirmation is received via the fourth channel. In still embodiments, the computer program products further include computer readable program code configured to process the one or more transactions on behalf of the user. In additional embodiments, the computer program products further include comprising computer readable program code configured to determine that the post verification confirmation requires multiple split keys from the one or more verifiers; wherein each of the split keys comprises at least a portion of a master key. In further embodiments, the computer program products further include computer readable program code configured to determine that all of the required split keys are received from the one or more users and process the one or more transactions.

Further provided herein are computer-implemented methods for multi-layer transaction tracking. In some embodiments, the methods include providing, by a processor, a first transaction channel to a user. In some embodiments, the methods include sending, by a processor, pre-authorization code to the user via the first transaction channel. In some embodiments, the methods include terminating, by a processor, the first transaction channel and provide a second transaction channel to the user. In some embodiments, the methods include receiving, by a processor, transaction data from the user comprising the pre-authorization code via the second transaction channel. In some embodiments, the methods include identifying, by a processor, one or more verifiers associated with the user for one or more transactions based on the transaction data. In some embodiments, the methods include sending, by a processor, a post verification notification to the one or more verifiers. In some embodiments, the methods include receiving, by a processor, a post verification confirmation from at least one of the one or more verifiers in response to the post verification notification. In other embodiments, the methods include terminating the third channel and providing a fourth channel, wherein the post verification confirmation is received via the fourth channel. In still embodiments, the methods include determining, by a processor, that the post verification confirmation requires multiple split keys from the one or more verifiers, wherein each of the split keys comprises at least a portion of a master key. In additional embodiments, the methods include determining, by a processor, that all of the required split keys are received from the one or more users and processing the one or more transactions.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1:
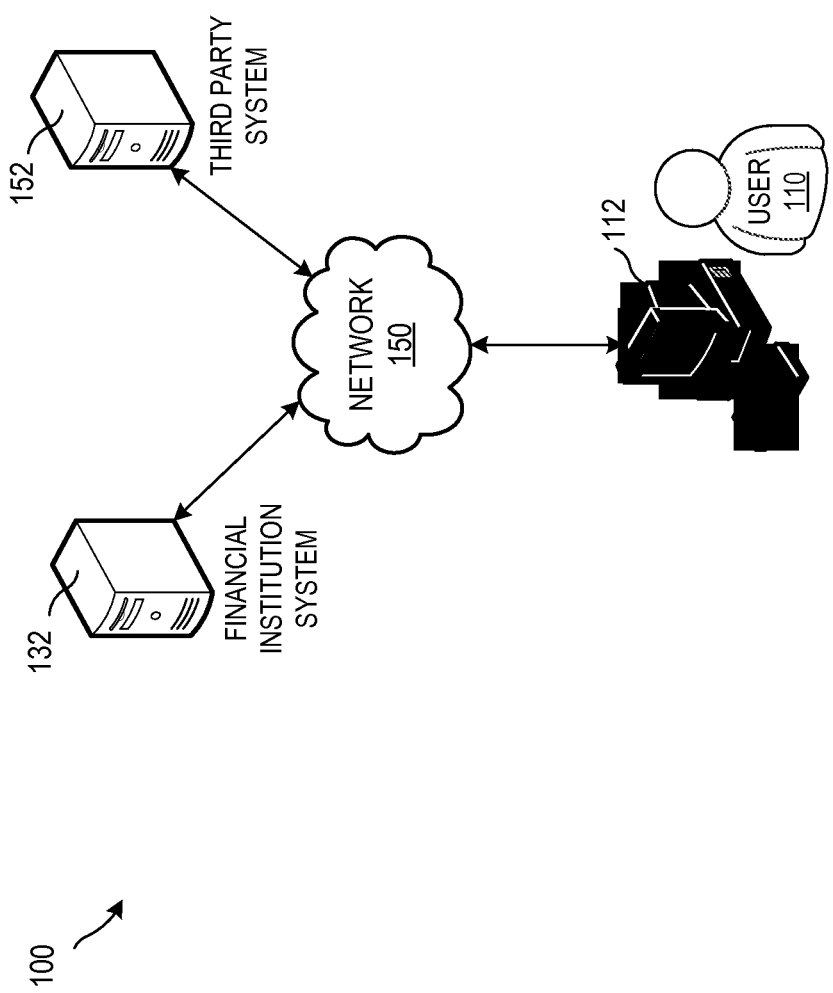
FIG. 1 provides a block diagram illustrating a system and environment for tracking transactions in accordance with the embodiments presented herein.

The embodiments presented herein are directed to systems, methods, and computer program products for tracking and analyzing transactions. The systems and methods apply various security layers to the tracking process. Depending on transaction parameters, transaction rules or user preferences, the security layers can be removed, added, or replaced as needed. The embodiments utilize synced or asynced communications to transmit data. The channels of communication are secured and outside of normal transaction processes and can be time dependent. Pre-authorization codes provide security for sending transaction data. At the other end of the process, post verification can be provided before transactions are fully processed. In some embodiments, multiple signatures from various authorized entities can be required in the post verification confirmation.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the figures, FIG. 1 provides a block diagram illustrating a system and environment 100 for monitoring transactions. The system 100 includes a user 110, a device 112 of the user 110, a financial institution system 132, and a third party system 152, which are in communication with each other via a network 150. In some embodiments, the user 110 includes at least one of a customer of a financial institution, an individual or entity associated with a customer of a financial institution, an employee of the user, a manager, a financial advisor, a support team member, an agent of the user, and the like. The third party system 152 can include a system maintained by, owned, or otherwise associated with a third party financial institution, an agent of the financial institution associated with the financial institution system 132, a vendor, a payee, a payor, and so forth.

In the illustrated embodiment, the financial institution system 132 provides a secure transaction channel to the user's device 112 such as a web service. The user 110 accesses the channel on the user's device 112 to send data to and receive data from the financial institution system 132 and/or the third party system 152. Similarly, the financial institution system 132 and the third party system 152 can also use the secure transaction channel to send data to and receive data from each other or from the user's device 112. The transferred data shared among the systems and devices of FIG. 1 can include pre-authorization codes and requests, transaction data or other files, post verification notifications and communications, transactions, and the like.

Figure 2:
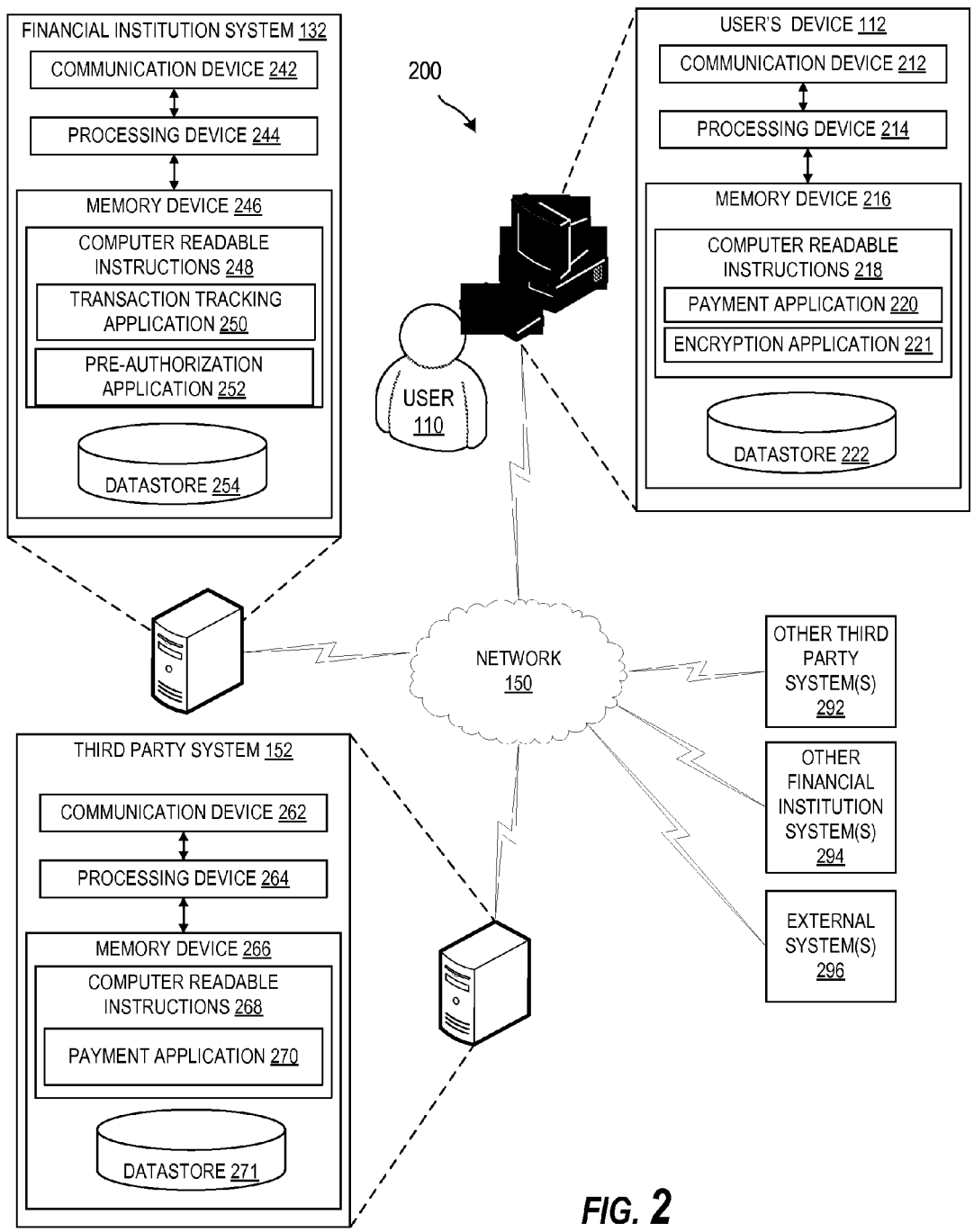
FIG. 2 provides a block diagram illustrating the financial institution system, the third party system, and the user capture device of FIG. 1, in accordance with various embodiments.

Referring now to FIG. 2, a block diagram illustrates an environment 200 for tracking multilayer transactions. The environment 200 includes the user's device 112, the third party system 152, and the financial institution system 132 of FIG. 1. The environment 200 further includes one or more other third party systems 292 (e.g., a partner, agent, or contractor associated with the financial institution system provider and/or a financial institution), one or more other financial institution systems 294 (e.g., a credit bureau, third party banks, and so forth), and one or more external systems 296. The systems and devices communicate with one another over the network 150 and perform one or more of the various steps and/or methods according to embodiments of the disclosure discussed herein. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The user's device 112, the third party system 152, and the financial institution system 132 each includes a computer system, server, multiple computer systems and/or servers or the like. The financial institution system 132, in the embodiments shown has a communication device 242 communicably coupled with a processing device 244, which is also communicably coupled with a memory device 246. The processing device 244 is configured to control the communication device 242 such that the financial institution system 132 communicates across the network 150 with one or more other systems. The processing device 244 is also configured to access the memory device 246 in order to read the computer readable instructions 248, which in some embodiments includes a data tracking application 250 and pre-authorization application 252. The memory device 246 also includes a datastore 254 or database for storing pieces of data that can be accessed by the processing device 244.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's device 112 includes a communication device 212 and communicably coupled with a processing device 214, which is also communicably coupled with a memory device 216. The processing device 214 is configured to control the communication device 212 such that the user's device 112 communicates across the network 150 with one or more other systems. The processing device 214 is also configured to access the memory device 216 in order to read the computer readable instructions 218, which in some embodiments includes a payment application 220 and encryption application 221. The memory device 216 also includes a datastore 222 or database for storing pieces of data that can be accessed by the processing device 214.

The third party system 152 includes a communication device 262 communicably coupled with a processing device 264, which is also communicably coupled with a memory device 266. The processing device 264 is configured to control the communication device 262 such that the third party system 152 communicates across the network 150 with one or more other systems. The processing device 264 is also configured to access the memory device 266 in order to read the computer readable instructions 268, which in some embodiments include a payment application 270. The memory device 266 also includes a datastore 271 or database for storing pieces of data that can be accessed by the processing device 264.

In some embodiments, the payment application 220 and encryption application 221 and the payment application 270 interact with the transaction tracking application 250 and pre-authorization application 252 to receive or provide service pre-authorization code, pre-authorization requests, post verification notifications and confirmations, and transaction data; analyze transaction data, process transactions, and calculate task data.

The applications 220, 221, 250, 252, and 270 are for instructing the processing devices 214, 244 and 264 to perform various steps of the methods discussed herein, and/or other steps and/or similar steps. In various embodiments, one or more of the applications 220, 221, 250, 252, and 270 are included in the computer readable instructions stored in a memory device of one or more systems or devices other than the systems 152 and 132 and the user's capture device 112. For example, in some embodiments, the application 220 is stored and configured for being accessed by a processing device of one or more third party systems 292 connected to the network 150. In various embodiments, the applications 220, 221, 250, 252, and 270 stored and executed by different systems/devices are different. In some embodiments, the applications 220, 221, 250, 252, and 270 stored and executed by different systems may be similar and may be configured to communicate with one another, and in some embodiments, the applications 220, 221, 250, 252, and 270 may be considered to be working together as a singular application despite being stored and executed on different systems.

In various embodiments, one of the systems discussed above, such as the financial institution system 132, is more than one system and the various components of the system are not collocated, and in various embodiments, there are multiple components performing the functions indicated herein as a single device. For example, in one embodiment, multiple processing devices perform the functions of the processing device 244 of the financial institution system 132 described herein. In various embodiments, the financial institution system 132 includes one or more of the external systems 296 and/or any other system or component used in conjunction with or to perform any of the method steps discussed herein. For example, the financial institution system 132 may include a financial institution system, an information technology system, and the like.

In various embodiments, the financial institution system 132, the third party system 152, and the user's device 112 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
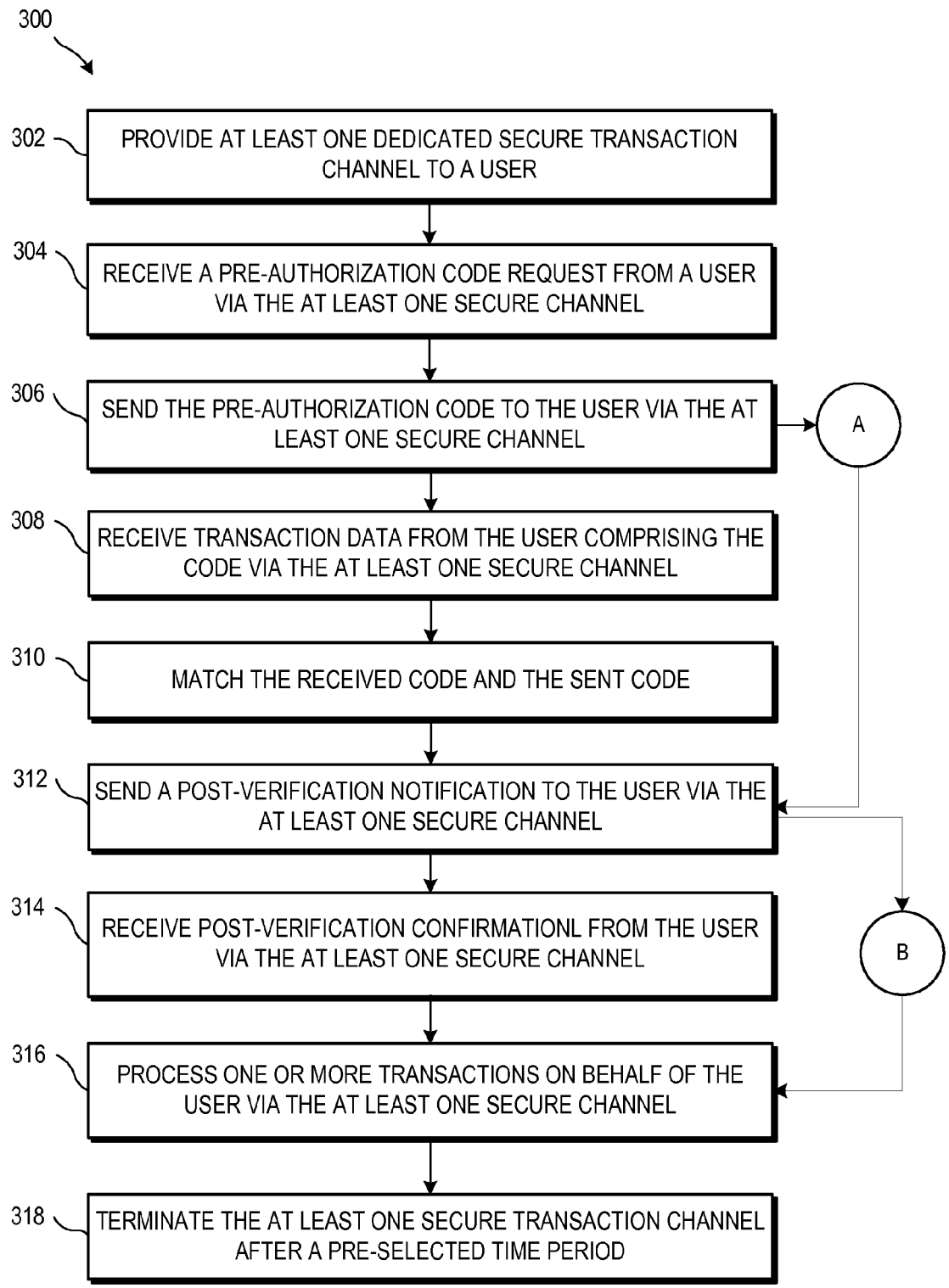
FIG. 3 is a flowchart illustrating a system and method for tracking and analyzing transactions in accordance with various embodiments.

FIG. 3 illustrates a flowchart providing an overview of a process 300 for multi-layer transaction tracking. One or more devices, such as the one or more computing devices and/or one or more other computing devices and/or servers of FIG. 1 and FIG. 2, can be configured to perform one or more steps of the process 300 described below. In some embodiments, the one or more devices performing the steps are associated with a financial institution. In other embodiments, the one or more devices performing the steps are associated with a merchant, business, partner, third party, credit agency, account holder, and/or user.

As illustrated at block 302, at least one dedicated secure transaction channel is provided to a user. The user includes, for example, at least one customer of a financial institution, at least one party to a transaction, at least one account holder, at least one agent of the user (e.g. employees or other entities associated with the user), and the like. The at least one dedicated secure transaction channel includes channels for exchanging information within and/or between computing devices. The secure transaction channel may include one or more web services, phone services, and communication protocols (e.g., FTP/SSL, SFTP, and so forth). For example, the system of process 300 may provide a web portal that is accessible to the user that can be used to exchange data. The at least one secure transaction channel functions outside of normal transaction channels. The user may, in one example, access on online banking account, call in using a telephone, or text to track or manage transactions in the normal course of business, but may use the secure transaction channel for select transactions. The at least one secure transaction channel may be used for transactions that involve large money transfers, sensitive transactions, urgent transactions, critical transactions, and complicated transactions. For example, payments greater than or equal to $1,000,000, transactions involving multiple parties, purchases for medical procedures, transactions that the user would prefer to keep private, or any other transaction that requires an added level of security can be processed via the at least one secure transaction channel. For example, by using the at least one secure transaction channel instead of normal transaction channels, a joint account owner or family member can keep certain transactions private.

In some embodiments, the system of process 300 analyzes transaction information received in normal transaction channels. Based on the analysis, the system can identify transactions that may be better suited for the secure transaction channel or process 300. Various transaction parameters such as transaction amounts, the number of transaction in a transaction bundle, parties to a transaction, whether the transaction is associated with countries having an alert status, and the like can be used to flag transactions. In some cases, the transaction parameters may indicate that certain government rules and regulations may apply to certain transactions. The system can notify users associated with a flagged transaction and recommend that the flagged transaction be processed through the at least one secure transaction channel. In other cases, the flagged transaction being conducted through the normal channels may be delayed or automatically transferred to another channel.

In further embodiments, the process 300 occurs via a single secure transaction channel. For example, communication is synced such that only one web service or protocol is used to send and receive the data of process 300. In other embodiments, the process 300 occurs via multiple secure transaction channels. In such embodiments, communication is asynced such that the transfer of data occurs across multiple channels. Once a secure transaction channel has been used to send or receive data, that channel may be terminated and a new channel created for the next transfer of data. The channel may be automatically terminated after one or more data transfers, after a certain period of time, and so forth. By using multiple secure transaction channels, the impact of a security break can be diminished because for any given channel security failure, only a portion of the data can be accessed. For example, even if an individual was able to overcome security for one channel and obtain the pre-authorization code, that individual would be unaware of the other channels and would not know about the post verification notification. When the user verifies the one or more transactions, modified transactions can be stopped at the post verification stage.

In still further embodiments, multiple types of secure transaction channels are used based on various data parameters. For example, data content containing transaction amounts and account numbers may use a FTP/SSL protocol for a high level of security while a less complicated protocol or a text to a registered device may be used for post verification. In another example, data that is not encrypted may be sent using a very secure protocol that encrypts the data being transferred while a less complicated protocol may be used for data that has already been encrypted. By mixing and matching the secure transaction channels in accordance with data parameters, the user is given greater flexibility to layer security and is afforded greater convenience in data communications.

In additional embodiments, the at least one secure transaction channel comprises host specific protocols, security algorithms, and procedures. The host includes an entity such as a financial institution that maintains and provides the at least one secure transaction channel. The host-specific protocols can include logic that the user associates with the host. For example, logic that requires the user to identify previously selected pictures and/or input picture identifiers, PINs, or other input can be used to ensure that the user is accessing the appropriate secure transaction channel.

As illustrated at block 304, a pre-authorization code request is received from the user. In some embodiments, the request is received via the secure transaction channel. In one exemplary embodiment, the user may initially log into an online or mobile banking account, and select a link that directs them to an outside web portal or other web service for sending the code request.

At least a portion of the pre-authorization code, in some embodiments, includes randomly generated text such as a block of random numbers, letters, and/or other symbols. In some cases, the pre-authorization code is associated with a predefined secured transaction channel. For example, at least a portion of the code may include a full or partial IP address, email address, telephone number, fax number, communication protocol rules, and/or other channel identifiers. In other cases, each pre-authorization code is associated with one or more selected users, account numbers, or transaction types. At least a portion of the code may include, for example, user identification such as a name, PIN, government identification, a phone number, or other identifier. At least a portion of the code may further include the last four digits or other portion of an account number, a routing number, a branch identifier, and the like. Further still, at least a portion of the code may include internal identifiers indicating a type of transaction or type of account. Withdrawals may be assigned a "W," payments may be assigned a numerical sequence such as "11," payroll transactions may be assigned the symbol "#&," and so forth. Transaction amounts over a set amount may be assigned a greater than symbol (>), transaction amounts less than a set amount may be assigned a less than symbol (<), and so forth. Other information may be included in the code such as the date the code was created, the date the code is set to expire, and so forth. In further embodiments, the code may be arranged in a certain order. Randomly generated text may be placed at the end, middle, or beginning of the code to differentiate it from other portions of the code discussed above. In other cases, portions of the code may be differentiated or separated by dashes, spaces, blocks, or other symbols.

In further embodiments, the pre-authorization code comprises multiple portions of a master code or key. For example, the pre-authorization code may include multiple split keys that are assigned to multiple entities such as various personnel associated with the user. In other cases, the split keys are associated with post verification as described herein below.

In additional embodiments, multiple pre-authorization codes are created and stored in a database. For example, a batch of codes may be created prior to receiving the request and stored in anticipation of the request. The stored codes may be generalized code such that any user can use the code for any type of transaction, or the stored codes may be tailored to specific account, users, types of transaction, and so forth. In other embodiments, pre-authorization code is created upon receiving the code request from the user.

As illustrated at block 306, the pre-authorization code is sent to the user. In some embodiments, the pre-authorization code is sent via the secure transaction channel. As discussed above, the pre-authorization code may be selected from a predefined set of pre-authorization codes or created upon receiving the code request. In cases where the code is selected from a database, the code may be selected based on the secure transaction channel, users, account data, transaction types, and so forth. As discussed above, the channel for sending the code can be different from the channel used to receive the code or the channel may be the same for both receiving the code request and sending the code.

In other embodiments, a device or program for creating pre-authorization code is sent to the user. For example, the user may receive software for creating the pre-authorization code at their device or system such that the user does not have to request the pre-authorization code for every transaction or batch of transactions. Instead, the user may create the pre-authorization code and send the code to the system of process 300.

As illustrated at block 308, transaction data is received from the user via the at least one transaction channel. In some embodiments, the transaction data comprises the pre-authorization code. The transaction data includes, for example, pay loads, transaction amounts, payees, payors, account numbers, transaction instructions, dates, contact information, agreement terms, and so forth. As described below with regard to FIG. 4, the transaction data and/or code may be encrypted.

As illustrated at block 310, the received code and the sent code are matched. The pre-authorization code that is sent to the user can be stored in a database. Upon receiving the code in the transaction data file, the received code can then be matched to the previously sent code stored in the database. If a match is not found the process 300 ends or starts over at block 302.

In some embodiments, the system of process 300 prepares the transaction data for further processing as described in more detail below.

As illustrated at block 312, a post verification notification is sent to the user via the at least one secure transaction channel. The post verification notification includes, for example, messages and/or code. The post verification notification can include a summary of the transaction such as the transaction amount, the payor, the payee, and account identifiers. In other cases, the post verification notification is simply a confirmatory statement regarding the transaction. The post verification notification can include at least a portion of the pre-authorization code or code or portions of code that is different from the pre-authorization code. For example, the post-verification notification may include a split key from the pre-authorization code. If a particular financial manager receives a split key or portion of a master key for the pre-authorization, the post verification notification for that financial manager may also include the split key or portion of the split key. In other examples, the split key may be different from the pre-authorization code. The entity associated with the user that sends the request for the pre-authorization code and the transaction data may be different from the entities that verify transaction or that otherwise respond to the post verification notification. For example, a low level employee may send the transaction data, but a higher level employee may be required to approve of the transaction before it is processed. In such cases, new code or split keys that are separate or different from the pre-authorization code may be used.

As illustrated at block 314, post verification confirmation is received from the user via the at least one secured transaction channel. In some embodiments, the post verification confirmation comprises transaction approval. In cases where the post verification notification is a message such as text, email, or phone message, the post verification confirmation can include a negative or positive confirmatory response. In some embodiments, the post verification confirmation includes a post verification code or portion of code. The post verification code may be the same as or different from the pre-authorization code. For example, the post verification code may comprise at least a portion of the pre-authorization code (e.g., a split key, an account number that is part of the pre authorization code, and the like) or the post verification code may be completely different from the pre-authorization code. For example, the post authorization code can be in a different format than the pre-authorization code, generated by different algorithms, or generated separately from the pre-authorization code. In some cases, the confirmatory response or refusal can include the post authorization code. In other cases, the post verification confirmation comprises one or more signatures.

As illustrated at block 316, one or more transactions are processed on behalf of the user via the at least one transaction channel. The transactions include money transfers, payroll, retirement accounts, loans, payments, deposits, and the like. The transaction channel used for the one or more transactions may be the same as the channel used to perform one or more of the previous steps of process 300, or it may be a different channel. For example, the system of process 300 may forward the transaction data to a third party to further processing.

As illustrated at block 318, the at least one secure transaction channel is terminated after a pre-selected time period. The at least one secure transaction channel can be terminated at any time. In some embodiments, the secure transaction channel is time sensitive such that the at least one channel terminates automatically after a certain period of time. In other cases, triggering events other than the expiration of a preselected time period can cause the termination of the at least one transaction channel. The transaction channel may be terminated, for example, after data is received or sent, after a specific transfer of data, or after the one or more transactions are processed.

Figure 4:
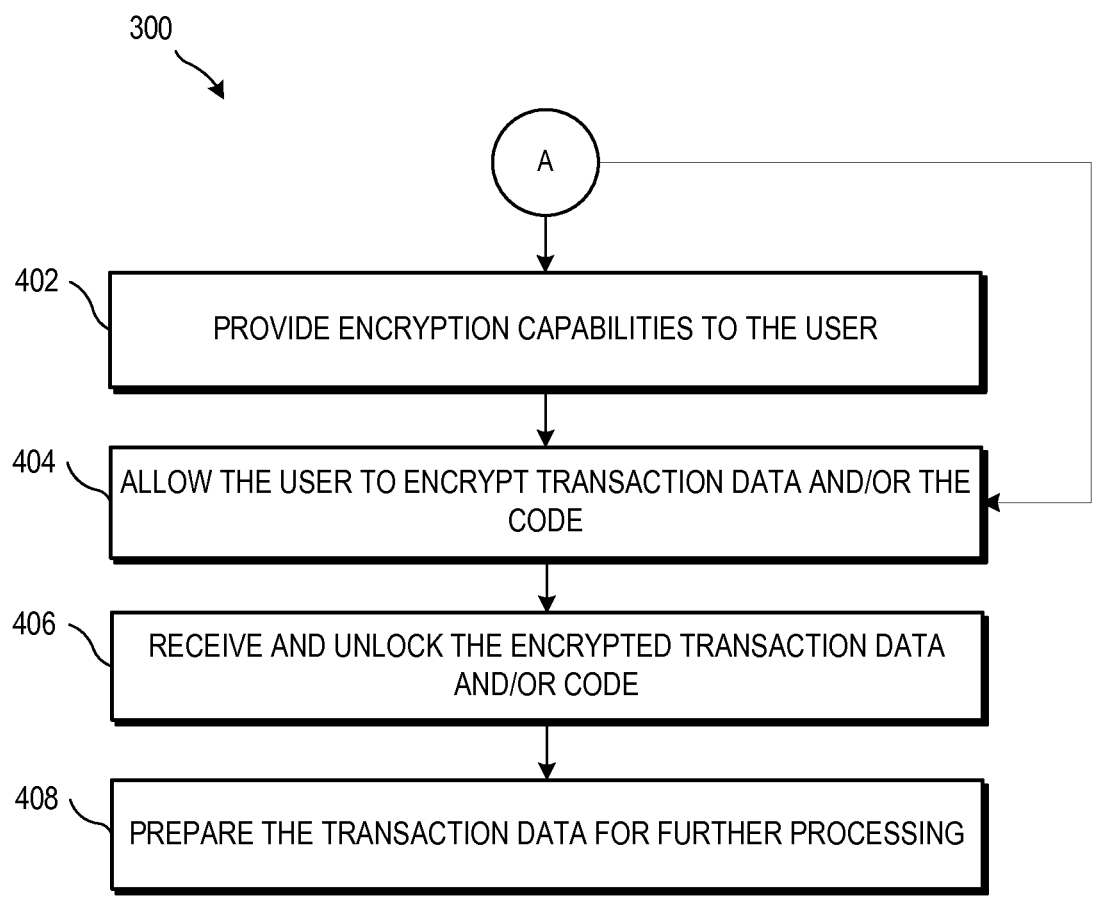
FIG. 4 is a flowchart illustrating a system and method for tracking and analyzing transactions in accordance with various embodiments.

Referring now to FIG. 4, the process 300 is further illustrated. As illustrated at block 402, encryption capabilities are provided to the user. The encryption capabilities include algorithms, data logic, software, devices, or other mechanism for encrypting data. Even though the at least one secure transaction channel encrypts transmitted data, the encryption means provides another layer of protection for the transaction data. Further, the user can be ensured that by using the encryption capabilities, the resulting encrypted data is compatible with the system of process 300.

As illustrated at block 404, the user is allowed to encrypt transaction data and/or the pre-authorization code. The user can encrypt the data or code using the provided encrypted capabilities or the user can encrypt the data or code via any other encryption software or devices. For example, the user may encrypt the transaction data using the pre-authorization code such that at least a portion of the pre-authorization code is needed to unlock the transaction data. In other cases, the user may encrypt both the transaction data and the pre-authorization code using encryption software. In some embodiments', the file containing the transaction data and/or pre-authorization code is placed in an encrypted container (e.g., a zip/pgp-type file with checksum, and the like).

As illustrated at block 406, the encrypted transaction data and/or code are received and unlocked. In some case, a token needed to unlock the encrypted transaction data and/or code is also received or retrieved. In cases where the data is encrypted with the encryption capabilities, the encrypted data can be compatible with the system of process 300.

As illustrated at block 408, the transaction data is prepared for further processing. In some embodiments, the transaction data is segregated into one or more transactions. For example, the transaction data may include multiple transactions. The multiple transactions may include various parameters such as different types of transactions, different amounts, different accounts, different payees, and so forth. In some cases, the multiple transactions are grouped into categories based on the transaction parameters. Depending on the transaction parameters, one or more of the transactions may require one or more signatures or post verification confirmation. A single payment of 10 million dollars may require at least two signatures from two different authorized entities (e.g., Treasurer and Sales), while multiple payments of less than $1,000 may require no signatures. Having two authorized entities sign all transactions can be a safeguard against a rogue employee. If one employee tampers with the one or more transactions (e.g., changes the amount, the accounts, and so forth), the other employee can identify the modification and stop the transaction.

In other embodiments, the transaction data preparation includes identifying parties to a transaction, verifying accounts, calculating costs, flagging transaction issues, and so forth. If the transaction data is incomplete or incorrect, the system of process 300 can notify the user of potential inconsistencies or issues and ask for additional data, corrections, or confirmations. For example, if an account number is missing digits or if interest rates have been incorrectly calculated, the systems of process 300 may modify the data and ask the user to verify if the modified data is correct. In some cases where issues arise due to intentional or unintentional data errors, the process 300 may end and start over.

Figure 5:
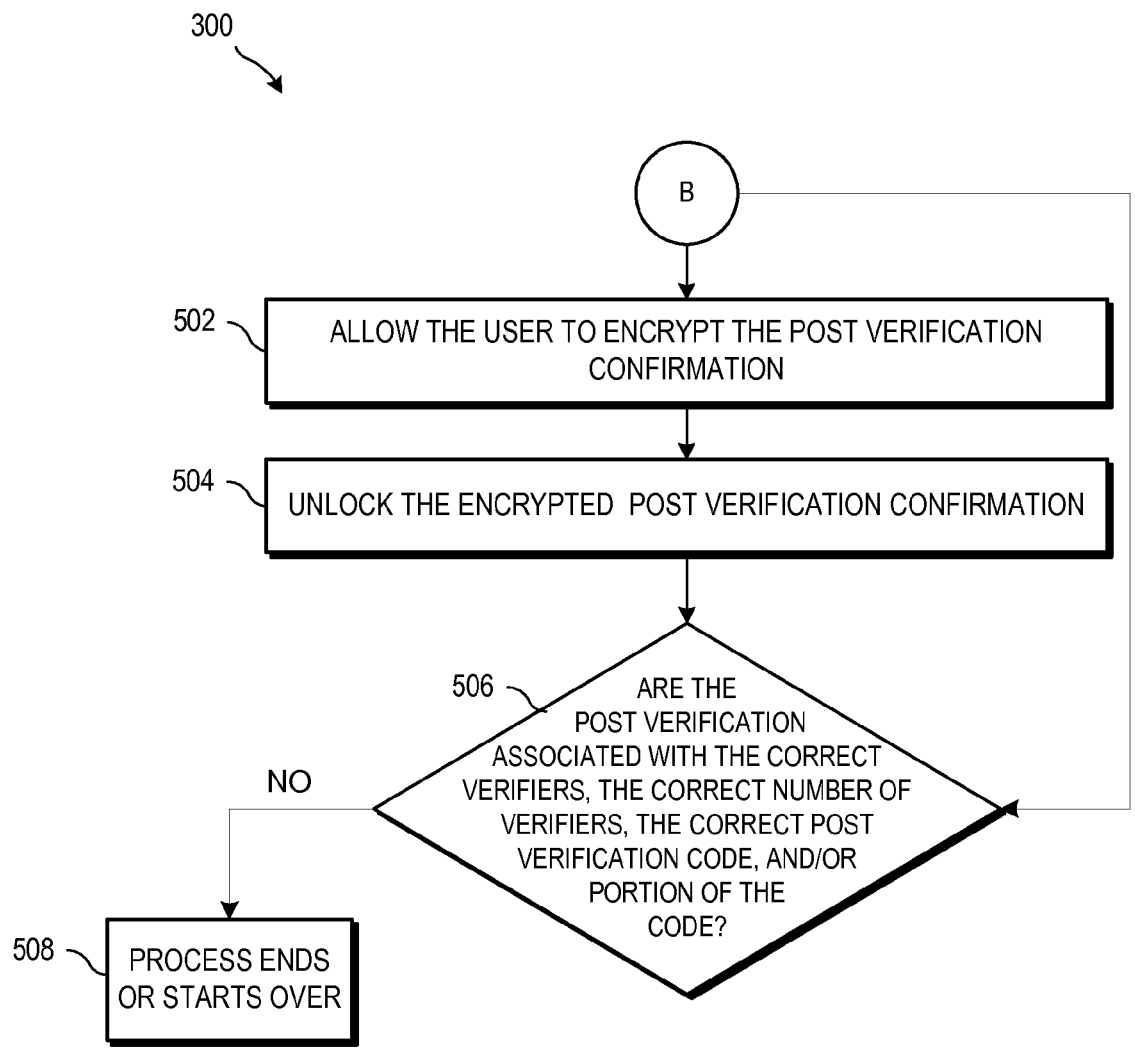
FIG. 5 is a flowchart illustrating a system and method for tracking and analyzing transactions in accordance with various embodiments.

Referring now to FIG. 5, the process 300 is further illustrated. As illustrated at block 502, the user is allowed to encrypt the post verification confirmation. As described hereinabove, the post verification confirmation can include positive or negative confirmatory responses to the post verification notification and/or code such as split keys. In some embodiments, the one or more signatures comprise a key or split key assigned to one or more entities. For example, if a manager is required to confirm and authorize a payment to a particular payee or a transaction over a preselected amount, the manager may confirm the payment by inputting code in response to the post verification notification. Split keys can be used when multiple managers or other entities are required to confirm and authorize a transaction. Financial advisors of varying levels of authority may be required to verify certain transactions associated with a particular account or above a threshold amount. For example, money transfers over 100 million dollars may require at least a chief financial officer and a high level manager to authorize the transaction. In other embodiments, the post verification confirmation comprises one or more signatures. The one or more signatures includes electronic signatures such as a name of the signor positioned between a forward slash and backward slash, scanned images of a handwritten signature, an inputted identification code, a communication from a registered or otherwise trustworthy device, and so forth.

In some embodiments, the user encrypts the post verification confirmation and/or the one or more signatures using encryption capabilities provided to them by the system of process 300 as detailed above. In such cases, the data is encrypted in a format that is compatible with the system of process 300. In other cases, the post verification confirmation and/or the one or more signatures are encrypted using third party tools.

As illustrated at block 504, the encrypted post verification confirmation and/or the one or more signatures are unlocked. The system may receive the key for unlocking the encrypted files from the user and/or detect and retrieve the third party tools necessary to unlock the encrypted files. In one example, the user uses code or portions of code that are part of the pre-authorization code or the post verification notification to lock the encrypted data so that the user does not need to send the key to the system.

As illustrated at decision block 506, it is determined whether the post verification confirmation is associated with the correct verifiers, the correct number of verifiers, the correct post verification code, and/or the correct portion of the code. If the post verification confirmation is not correct, the process ends and/or starts over as illustrated at block 508. In alternative embodiments, the system of process 300 requests additional information. For example, if one of the verifiers does not include a signature or the correct type of signature (e.g., a handwritten signature may be required as opposed to an electronic signature), the system may ask for corrective action and/or an additional signature. The user may receive an error message and instructions on how to correct the post verification confirmation. In other cases, the system may not receive a needed response from the verifier and may prompt the verifier to respond in a timely manner. In still other cases, the post verification confirmation may not be capable of correction and may require the process to start over. For example, if the post verification confirmation comprises a mismatching signature and split key, the process 300 may be terminated and the confirmation forwarded to a task group for analysis and reporting. The task group may analyze the confirmation to determine if a misappropriation occurred or if there was a security break in the communication channel associated with the confirmation. If the post verification confirmation is determined to be correct, the one or more transactions are processed as detailed above.

In some embodiments, required or optional verifiers are identified based on transaction parameters, user instructions, previous transaction data, and the like. The transaction data or a separate communication from the user may include instructions that contain rules for certain transactions. For example, the rules may indicate that transaction bundles of over 100 transactions may not need a signature for each transaction such that a single manager's signature is compliant, while transaction bundles of less than 25 transactions may require at least one manager's signature for each transaction. In other examples, the rules may require that certain or all transactions associated with the user have signatures from specific people or signatures from entities having a specific level of authority.

The system of process 300 can also analyze the transaction history of the user to determine the identities of the verifiers. For example, the system may determine from the transaction history that managers having a certain job title have signed and authorized 95% of transactions within a certain transaction amount range, that occur during a certain time of month, or that involve a specific payee. The system can identify transactions having certain transaction parameters such as transaction amount, transaction request time periods, and payees from the transaction data and match the transactions to managers who have previously authorized and signed transactions. To ensure that the verifiers are correctly identified, the system may require that at least 50% or that 100% of the transactions were previously signed by identified entities. The system can also determine changes in verifiers or the number of verifiers by analyzing the data over time. For example, the system may determine that transactions less than $50,000 only required one signature from a low level manager 6 months earlier than the current date while such transactions that occurred more recently (e.g., in the previous two weeks) required at least two signatures from higher level managers. Based on the updated trends, the system can determine that multiple signatures from high-level entities are required.

The post verification confirmation can be compared to the identified verifiers to determine if the correct verifiers and the correct number of verifiers have authorized the transaction. For example signee names, job titles, personal identifiers, or split keys can be compared to the identified verifiers to determine if the entities verifying the one or more transactions are authorized to do so.

In cases where the post verification confirmation includes at least a portion of code, the system of process 300 may compare the pre-authorization code or code contained in the post-verification notification to the code contained in the post verification confirmation. If multiple verifiers are required to authorize the one or more transaction and sign the post verification confirmation, each verifier may include a split key or portion of code that is part of a master key. The process 300 may end or start over if one or more of the split keys are incorrect or missing. For example, even if a financial manger response to the post verification notification includes a signature for the one or more transactions, the process 300 may still terminate if the financial manager does not include the split key in the post verification confirmation. In other situations, either the split key or the signature may be required but not both. The system of process 300 may further require that the received signature and/or split key are associated with a device registered and in communication with the system.

Figure 6:
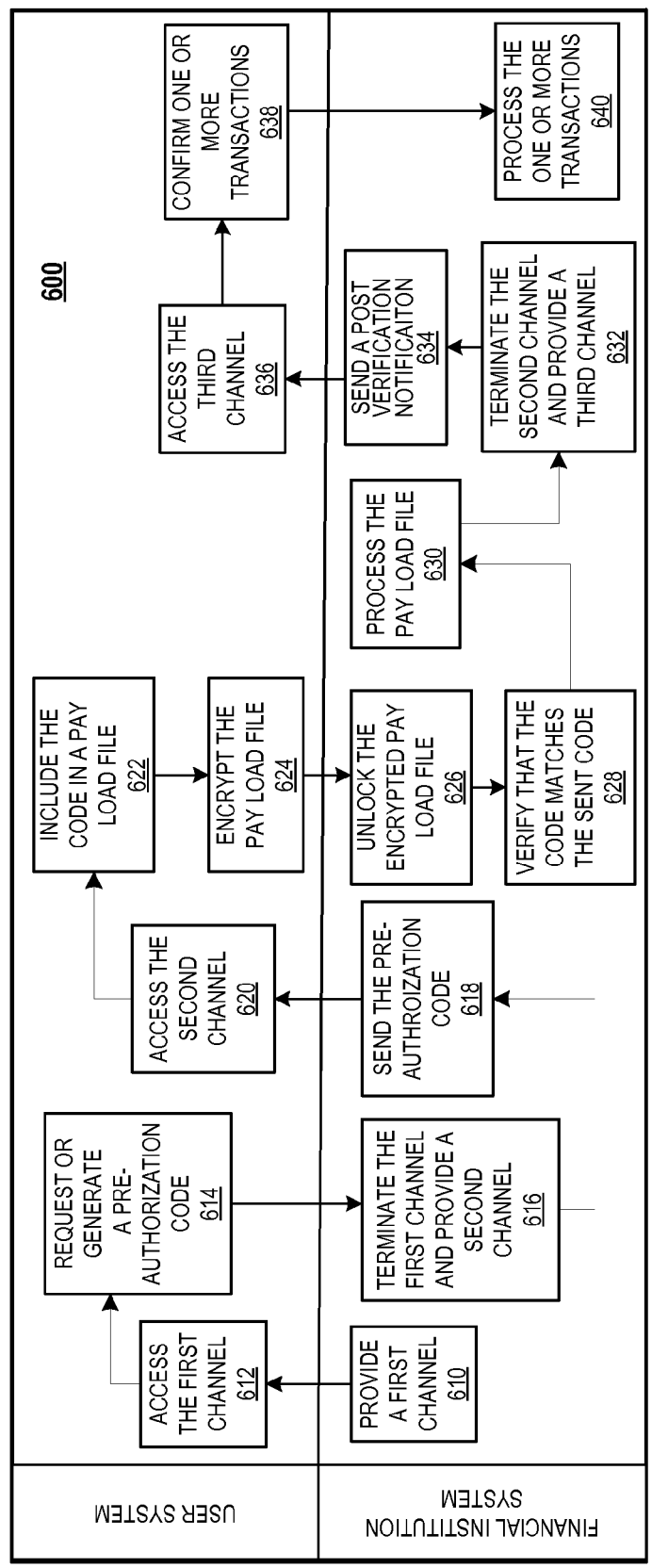
FIG. 6 is a flow diagram illustrating a system and process for tracking and analyzing transaction data.

Referring now to FIG. 6, a block diagram of a system and environment 600 for a process of tracking transactions is illustrated. At least a portion of the process 300 may be utilized in the system and environment 600. The system and environment 600 includes a user system such as the user's device 112 of FIGS. 1-2 and a financial institution system such as the financial institution system 132 of FIGS. 1-2.

As illustrated at block 610, a first channel is provided. The channels illustrated in FIG. 6 include channels for exchanging information within and/or between the user system, the financial institution systems, or a third party system (not shown). The secure transaction channel may include one or more web services and communication protocols (e.g., FTP/SSL, SFTP, and so forth).

As illustrated at block 612, the user accesses the first channel using the user system. In exemplary embodiments, the user receives an email, text, or other communication containing a link to access the first channel or other channels illustrated in FIG. 6. In other examples, the user may access the first channel via a web portal, an online or mobile financial account, or other web service. In some examples, the user may be required to input information such as passwords, user names, or answers to security questions. In still other examples, the channel may provide pictures, graphics, symbols, logos, video, audio, or other displays that the user previously selected and that are known only to the user. In this way, the user is informed that the channel is trustworthy.

As illustrated at block 614, the user, via the user system, requests a pre-authorization code. In other embodiments, the user system generates the pre-authorization code. This allows the user to generate the pre-authorization code without having to request the code each time. For example, the financial institution system may provide a device or software for generating the pre-authorization code to the user. In other cases, the user may prefer to not download software and may prefer to request the pre-authorization code.

As illustrated at block 616, the first channel is terminated and a second channel is provided. In some embodiments, the first channel is automatically terminated. For example, the first channel may be time dependent such that it is automatically terminated after a certain time period. In other cases, the first channel is terminated after the request for the pre-authorization code is received.

As illustrated at block 618, the financial institution system sends the pre-authorization code to the user via the second channel. The financial institution system can generate the pre-authorization code upon receipt of the request or the financial institution system may provide a stored pre-authorization code that was previously generated. The pre-authorization code can include random sequences of text, an account number, a personal identifier, internal identifiers, and the like. Details regarding the pre-authorization code are provided hereinabove with regard to FIG. 3.

As illustrated at block 620, the user accesses the second channel via the user system. The second channel may be the same type of channel as the first channel. For example, the second channel may use the same types of protocols or web services. In other cases, the second channel may be different that the first channel.

As illustrated at block 622, the user system includes the pre-authorization code in a payload file. The payload file includes transaction data related to one or more transactions. For example, the payload file may include transaction amounts, terms of the transactions, account numbers, payee and payor identifiers, and the like.

As illustrated at block 624, the user system encrypts the payload file. In some embodiments, the financial system provides encryption capabilities (e.g., encryption software/device) to the user (not shown). In other embodiments, the user system using an internal encryption device or a third party encryption device to encrypt the payload file.

As illustrated at block 626, the financial institution system unlocks the encrypted payload file. In cases where the user has encrypted the payload file using internal or third party encryption devices, the user may provide a key to the financial institution system and the encryption device to unlock the encrypted file.

As illustrated at block 628, the financial institution system verifies that the code contained in the payload file matches the sent pre-authorization code. In this way, yet another layer of security may be added to the process. Further, the financial system determines that the correct user is using the channel.

As illustrated at block 630, the financial institution system processes the payload file. For example, the financial institution system may analyze the transaction data to prepare for processing of transactions or to identify verifiers and generate the post verification notification.

As illustrated at block 632, the financial institution system terminates the second channel and provides a third channel. The third channel can include the same type of channel as the first and/or second channel or the third channel may be different from the first and/or second channel. In some embodiments, the first channel and second channel comprises web channels associated with security based protocols that include encryption of the data being transferred, and the third channel includes a phone channel for texting to a registered and trustworthy device of the user.

As illustrated at block 634, the financial institution system sends a post verification notification to the user system via the third channel. The post verification notification can be at least one of a message, a transaction summary, and code. The post verification notification can include a transaction summary or a confirmatory statement regarding the transaction. The post verification notification can also include at least a portion of the pre-authorization code or code or portions of code that is entirely different from the pre-authorization code.

As illustrated at block 636, the user accesses the third portal via the user system. Although the process illustrated in FIG. 6 shows three channels, it will be under that any number of channels may be used. For example, every time data is sent or received, a new channel may be used. In other examples, a single channel may be used in all data transfers.

As illustrated at block 638, the user confirms one or more transaction and the user system send the confirmation to the financial institution system. The confirmation can include responses such as a text or email confirming or denying the one or more transactions, an electronic signature, an image of a signature, a code or split key, a PIN, and the like.

As illustrated at block 640, the financial institution system processes one or more transactions. In some embodiments, the one or more transactions are processed via a fourth channel. In further embodiments, the one or more transactions may be sent to a third party for authorization or further processing.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or teams thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for multi-layer transaction tracking, the system comprising:
   a computer apparatus including a processor and a memory; and
   a software module stored in the memory, comprising executable instructions that when executed by the processor cause the processor to:
   provide a first dedicated secure transaction channel to a device of a user for sending information to and receiving information from the device of the user, wherein the user is approved to authorize one or more transactions with a payee but is not approved to verify the one or more transactions;
   receive, via the first dedicated secure transaction channel, a pre-authorization code request from the user, wherein the pre-authorization code request comprises a request from the user to conduct the one or more transactions in a secure manner;
   in response to receiving the request for the pre-authorization code from the user, terminate the first dedicated secure transaction channel;
   provide a second dedicated secure transaction channel to a device of the user for sending information to and receiving information from the device of the user;
   generate a pre-authorization code in response to the received pre-authorization code request;
   in response to generating the pre-authorization code, transmit control signals, via the second dedicated secure transaction channel, configured to cause the device of the user to display the pre-authorization code;
   in response to generating the pre-authorization code, transmit control signals, via the second dedicated secure transaction channel, configured to cause the device of the user to encrypt transaction data;
   receive, via the second dedicated secure transaction channel, the encrypted transaction data from the user, wherein the encrypted transaction data comprises at least the pre-authorization code;
   unlock the encrypted transaction data to create an unencrypted transaction data;
   identify a verifier associated with the user for the one or more transactions based on the transaction data;
   identify the received pre-authorization code in the unencrypted transaction data;
   match the received pre-authorization code and the sent pre-authorization code;
   in response to matching the received pre-authorization code and the sent pre-authorization code, provide a third dedicated secure transaction channel to a device of the verifier for sending information to and receiving information from the device of the verifier, wherein the verifier has authority to verify the one or more transactions, and wherein the verifier is not the payee;

in response to providing the third dedicated secure transaction channel to the device of the verifier, transmit control signals, via the third dedicated secure transaction channel, configured to cause the device of the verifier to display a post verification notification, wherein the post verification notification comprises the one or more transactions and a post verification code, wherein the post verification code and the pre-authorization code comprise different code sequences;

receive, via the third dedicated secure transaction channel, a post verification confirmation from the verifier in response to the post verification notification; and in response to receiving the post verification confirmation, process the one or more transactions to the payee.

2. The system of claim 1, wherein the executable instructions further cause the processor to:
terminate the third dedicated secure transaction channel and provide a fourth dedicated secure transaction channel;
wherein the post verification confirmation is received via the fourth dedicated secure transaction channel.

3. The system of claim 1, wherein the executable instructions further cause the processor to:
determine that the post verification confirmation requires one or more signatures from the identified one or more verifiers;
determine that all required signatures are received; and
process the one or more transactions to the payee.

4. The system of claim 1, wherein the executable instructions further cause the processor to:
determine that the post verification confirmation requires multiple split keys from the verifier and a second verifier;
wherein each of the multiple split keys comprises at least a portion of a master key.

5. The system of claim 4, wherein the executable instructions further cause the processor to:
determine that the multiple split keys are received from the verifier and the second verifier;
in response to determining that the multiple split keys are received from the verifier and the second verifier, process the one or more transactions to the payee.

6. The system of claim 4, wherein the executable instructions further cause the processor to:
determine that not all of the multiple split keys are received;
in response to determining that not all of the multiple split keys are received, stop payment for the one or more transactions.

7. The system of claim 1, wherein the executable instructions further cause the processor to:
create multiple pre-authorization codes;
store the multiple pre-authorization codes in a database;
receive the pre-authorization code request from the user;
select one of the stored codes for sending to the user.

8. A computer program product for multi-layer transaction tracking, the computer program product comprising:
a non-transitory computer readable storage medium having computer readable program code embodied therewith, the computer readable program code comprising:

computer readable program code configured to provide a first dedicated secure transaction channel to a device of a user for sending information to and receiving information from the device of the user, wherein the user is approved to authorize one or more transactions with a payee but is not approved to verify the one or more transactions;

computer readable program code configured to receive, via the first dedicated secure transaction channel, a pre-authorization code request from the user, wherein the pre-authorization code request comprises a request from the user to conduct the one or more transactions in a secure manner;

computer readable program code configured to, in response to receiving the request for the pre-authorization code from the user, terminate the first dedicated secure transaction channel;

computer readable program code configured to provide a second dedicated secure transaction channel to a device of the user for sending information to and receiving information from the device of the user;

computer readable program code configured to generate a pre-authorization code in response to the received pre-authorization request;

computer readable program code configured to, in response to generating the pre-authorization code, transmit control signals, via the second dedicated secure transaction channel, configured to cause the device of the user to display the pre-authorization code to the user;

computer readable program code configured to, in response to generating the pre-authorization code, transmit control signals, via the second dedicated secure transaction channel, configured to cause the device of the user to encrypt transaction data;

computer readable program code configured to receive, via the second dedicated secure transaction channel, the encrypted transaction data from the user, wherein the encrypted transaction data comprises at least the pre-authorization code;

computer readable program code configured to unlock the encrypted transaction data to create an unencrypted transaction data;

computer readable program code configured to identify a verifier associated with the user for the one or more transactions based on the transaction data;

computer readable program code configured to identify the received pre-authorization code in the unencrypted transaction data;

computer readable program code configured to match the received pre-authorization code and the sent pre-authorization code;

computer readable program code configured to, in response to matching the received pre-authorization code and the sent pre-authorization code, provide a third dedicated secure transaction channel to a device of the verifier for sending information to and receiving information from the device of the verifier, wherein the verifier has authority to verify the one or more transactions, and wherein the verifier is not the payee;

computer readable program code configured to, in response to providing the third dedicated secure transaction channel to the device of the verifier, transmit control signals, via the third dedicated secure transaction channel, configured to cause the device of the verifier to display a post verification notification, wherein the post verification notification comprises the one or more transactions and a post verification code, wherein the post verification code and the pre-authorization code comprise different code sequences;

computer readable program code configured to receive, via the third dedicated secure transaction channel, a post verification confirmation from the verifier in response to the post verification notification; and computer readable program code configured to, in response to receiving the post verification confirmation, process the one or more transactions to the payee.

9. The computer program product of claim 8, further comprising computer readable program code configured to:
terminate the third dedicated secure transaction channel; and
provide a fourth dedicated secure transaction channel;
wherein the post verification confirmation is received via the fourth dedicated secure transaction channel.

10. The computer program product of claim 8, further comprising computer readable program code configured to:
determine that the post verification confirmation requires multiple split keys from the verifiers verifier and a second verifier;
wherein each of the multiple split keys comprises at least a portion of a master key.

11. The computer program product of claim 10, further comprising computer readable program code configured to:
determine that the multiple split keys are received from the verifier and the second verifier; and
in response to determining that the multiple split keys are received from the verifier and the second verifier, process the one or more transactions to the payee.

12. A computer-implemented method for multi-layer transaction tracking, the method comprising:
providing, by a processor, a first dedicated secure transaction channel to a device of a user for sending information to and receiving information from the device of the user, wherein the user is approved to authorize one or more transaction with a payee but is not approved to verify the one or more transactions;
receiving, by a processor, via the first dedicated secure transaction channel, a pre-authorization code request from the user, wherein the pre-authorization request comprises a request from the user to conduct the one or more transactions in a secure manner;
in response to receiving the request for the pre-authorization code from the user, terminating, by a processor, the first dedicated secure transaction channel;
providing, by a processor, a second dedicated secure transaction channel to a device of the user for sending information to an receiving information from the device of the user;
generating, by a processor, a pre-authorization code in response to the received pre-authorization code request;
in response to generating the pre-authorization code, transmitting, by a processor, control signals, via the second dedicated secure transaction channel, configured to cause the device of the user to display the pre-authorization code to the user;

in response to generating the pre-authorization code, transmitting, by a processor, control signals, via the second dedicated secure transaction channel, configured to cause the device of the user to encrypt transaction data;

receiving, by a processor, via the second dedicated secure transaction channel, the encrypted transaction data from the user, wherein the encrypted transaction data comprises at least the pre-authorization code;

unlocking, by a processor, the encrypted transaction data to create an unencrypted transaction data;

identifying, by a processor, a verifier associated with the user for the one or more transactions based on the transaction data;

identifying, by a processor, the received pre-authorization code in the unencrypted transaction data;

matching, by a processor, the received pre-authorization code and the sent pre-authorization code;

in response to matching the received pre-authorization code and the sent pre-authorization code, provide a third dedicated secure transaction channel to a device of the verifier for sending information to and receiving information from the verifier, wherein the verifier has authority to verify the one or more transactions, and wherein the verifier is not the payee;

in response to providing the third dedicated secure transaction channel to the device of the verifier, transmit control signals, via the third dedicated secure transaction channel, configured to cause the device of the verifier to display a post verification notification, wherein the post verification notification comprises the one or more transactions and a post verification code, wherein the post verification code and the pre-authorization code comprise different code sequences;

receiving, by a processor, via the third dedicated secure transaction channel, a post verification confirmation from the verifier in response to the post verification notification; and in response to receiving the post verification confirmation, processing, by a processor, the one or more transactions to the payee.

13. The computer-implemented method of claim 12, further comprising:
terminating the third dedicated secure transaction channel and providing a fourth dedicated secure transaction channel;
wherein the post verification confirmation is received via the fourth dedicated secure transaction channel.

14. The computer-implemented method of claim 12, further comprising:
determining, by a processor, that the post verification confirmation requires multiple split keys from the verifier and a second verifier, wherein each of the split keys comprises at least a portion of a master key.

15. The computer-implemented method of claim 14, further comprising:
determining, by a processor, that the multiple split keys are received from the verifier and the second verifier; and
in response to determining that the multiple split keys are received from the verifier and the second verifier, processing the one or more transactions to the payee.

* * * * *